United States Patent
Ko (10) Patent No.: US 9,573,556 B2
(45) Date of Patent: Feb. 21, 2017

(54) AIRBAG SYSTEM FOR VEHICLE

(71) Applicant: HYUNDAI MOBIS CO., LTD., Seoul (KR)

(72) Inventor: Seok Hoon Ko, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 38 days.

(21) Appl. No.: 14/750,712

(22) Filed: Jun. 25, 2015

(65) Prior Publication Data

US 2016/0031408 A1 Feb. 4, 2016

(30) Foreign Application Priority Data

Jul. 30, 2014 (KR) ........................ 10-2014-0097357

(51) Int. Cl.
| | |
|---|---|
| *B60R 21/26* | (2011.01) |
| *B60R 21/261* | (2011.01) |
| *B60R 21/239* | (2006.01) |
| *B60R 21/233* | (2006.01) |

(52) U.S. Cl.
CPC .......... *B60R 21/261* (2013.01); *B60R 21/233* (2013.01); *B60R 21/239* (2013.01); *B60R 2021/2395* (2013.01); *B60R 2021/23308* (2013.01); *B60R 2021/2612* (2013.01)

(58) Field of Classification Search
CPC ................. B60R 21/261; B60R 21/239; B60R 2021/2395
See application file for complete search history.

(56) References Cited

U.S. PATENT DOCUMENTS

| | | | | | |
|---|---|---|---|---|---|
| 7,448,646 | B2* | 11/2008 | Hall | ................... | B60R 21/2338 280/739 |
| 7,600,782 | B2* | 10/2009 | Ishiguro | ................ | B60R 21/239 280/739 |
| 7,857,347 | B2* | 12/2010 | Abe | .................... | B60R 21/2338 280/729 |
| 7,931,297 | B2* | 4/2011 | Abe | .................... | B60R 21/2338 280/739 |
| 8,070,183 | B2* | 12/2011 | Kumagai | ............ | B60R 21/2338 280/732 |
| 8,870,223 | B2* | 10/2014 | Choi | ................... | B60R 21/2338 280/739 |
| 2007/0170710 | A1* | 7/2007 | Bouquier | .............. | B60R 21/239 280/739 |
| 2011/0101652 | A1* | 5/2011 | Abe | ................... | B60R 21/2338 280/728.3 |
| 2014/0306434 | A1* | 10/2014 | Jang | ..................... | B60R 21/239 280/739 |

FOREIGN PATENT DOCUMENTS

KR 10-2014-0013361 A 2/2014

* cited by examiner

*Primary Examiner* — Faye M Fleming
(74) *Attorney, Agent, or Firm* — Knobbe Martens Olson & Bear LLP (57) ABSTRACT

An airbag system for a vehicle may include: an inflator; a cushion unfolded by gas supplied from the inflator so as to protect a passenger; a variable hole formed in the cushion so as to discharge gas; and an adjusting unit mounted on the cushion and opening/closing the variable hole according to how much the cushion is unfolded.

10 Claims, 11 Drawing Sheets

AIRBAG SYSTEM FOR VEHICLE

CROSS-REFERENCES TO RELATED APPLICATIONS

The present application claims priority to Korean application number 10-2014-0097357, filed on Jul. 30, 2014, which is incorporated by reference in its entirety.

BACKGROUND

The present disclosure relates to an airbag system for a vehicle.

In general, an airbag system for a vehicle is installed in a vehicle, and serves to protect a passenger seated on a driver's seat or passenger seat from an impact when a collision accident occurs.

The airbag system for a vehicle includes a cushion for protecting a passenger and an inflator for supplying gas to the cushion. Typically, a dual inflator has been used to unfold the cushion at low pressure or high pressure.

The related technology is disclosed in Korean Patent Laid-open Publication No. 2014-0013361 published on Feb. 5, 2014, and entitled "Airbag apparatus for vehicle".

SUMMARY

Embodiments of the present invention are directed to an airbag system for a vehicle, which is capable of adjusting the amount of discharged gas depending on the position of a passenger while requiring a low cost.

In one embodiment, an airbag system for a vehicle may include: an inflator; a cushion unfolded by gas supplied from the inflator so as to protect a passenger; a variable hole formed in the cushion so as to discharge gas; and an adjusting unit mounted on the cushion and opening/closing the variable hole according to how much the cushion is unfolded.

The adjusting unit may include: an opening/closing part coupled to the outside of the cushion and formed to cover the variable hole; and a connection part having one end coupled to the inside of the cushion and the other end coupled to the opening/closing part.

The airbag system may further include an induction part coupled to the inside of the cushion and having an internal path for guiding movement of the connection part.

The opening/closing part may include: a center opening/closing part having one end coupled to the outside of the cushion and the other end coupled to the connection part, and arranged over the variable hole so as to cover the variable hole; and a side opening/closing part extended from both side ends of the center opening/closing part and coupled to the outside of the cushion.

The induction part may include: a connection induction part coupled to the inside of the cushion and guiding movement of the connection part; and an opening/closing induction part having an internal path which is gradually extended toward the variable hole from the connection induction part.

When the cushion is unfolded, the opening/closing part may be moved in connection with the movement of the connection part, and the position of the opening/closing part may be fixed while the opening/closing part is fitted into the internal path.

The variable hole may be formed at a position deviating from the center of the cushion, and the one end of the connection part may be coupled to the center of the front and rear surfaces of the cushion.

A portion of the variable hole, closed by the opening/closing part, may increase while the one end of the connection part is moved as the cushion is unfolded.

The cushion may include: a main cushion unfolded by gas supplied from the inflator; and an auxiliary cushion protruding from the top center of the main cushion and communicating with the main cushion, and the one end of the connection part may be coupled to the auxiliary cushion.

The cushion may have an outlet for discharging internal gas to the outside.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Generally, the dual inflator has a double chamber structure, and thus the dual inflator is heavier and more expensive than a single inflator. Furthermore, since the dual inflator requires a separate sensing unit such as a sensor to check whether a passenger is seated, the number of parts inevitably increases.

Figure 1:
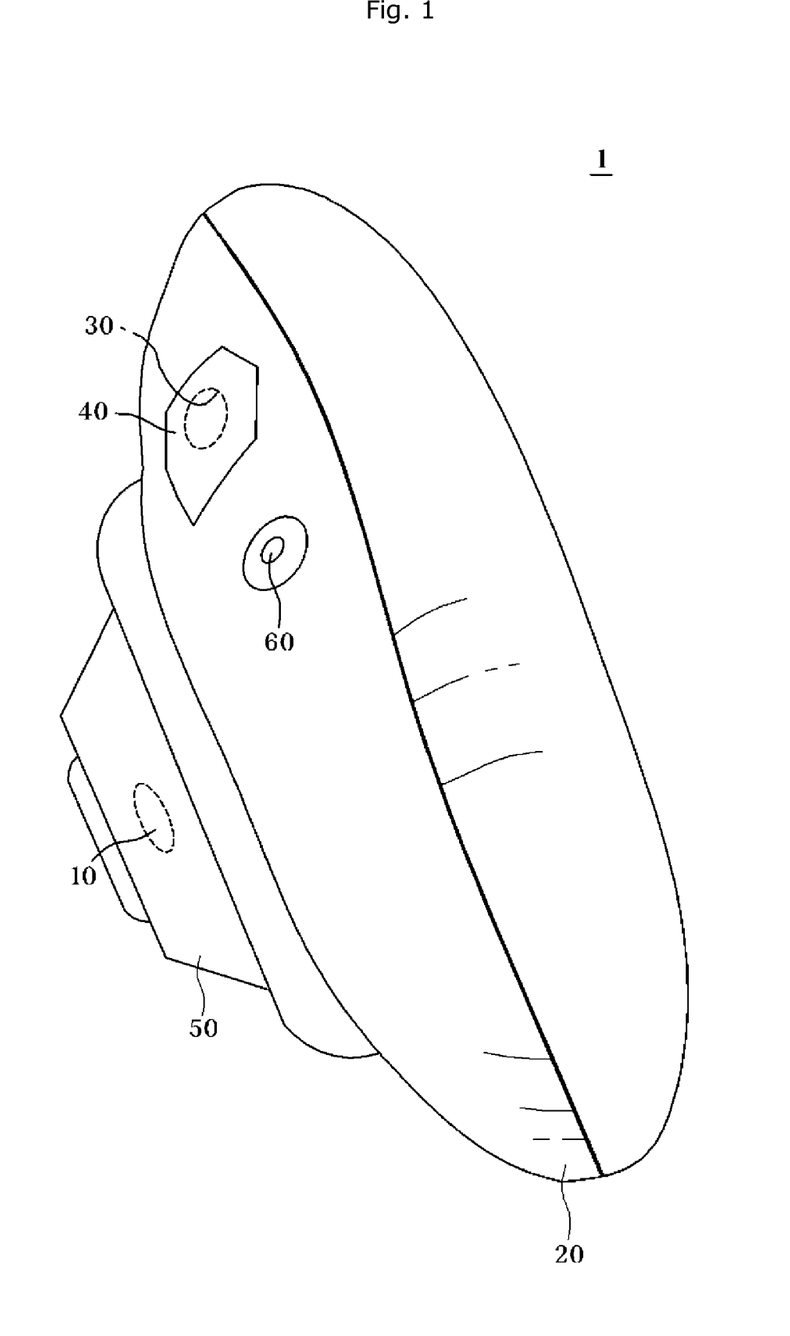
FIG. 1 is a diagram schematically illustrating a cushion in a low-pressure state in an airbag system for a vehicle in accordance with an embodiment of the present invention.
Figure 2:
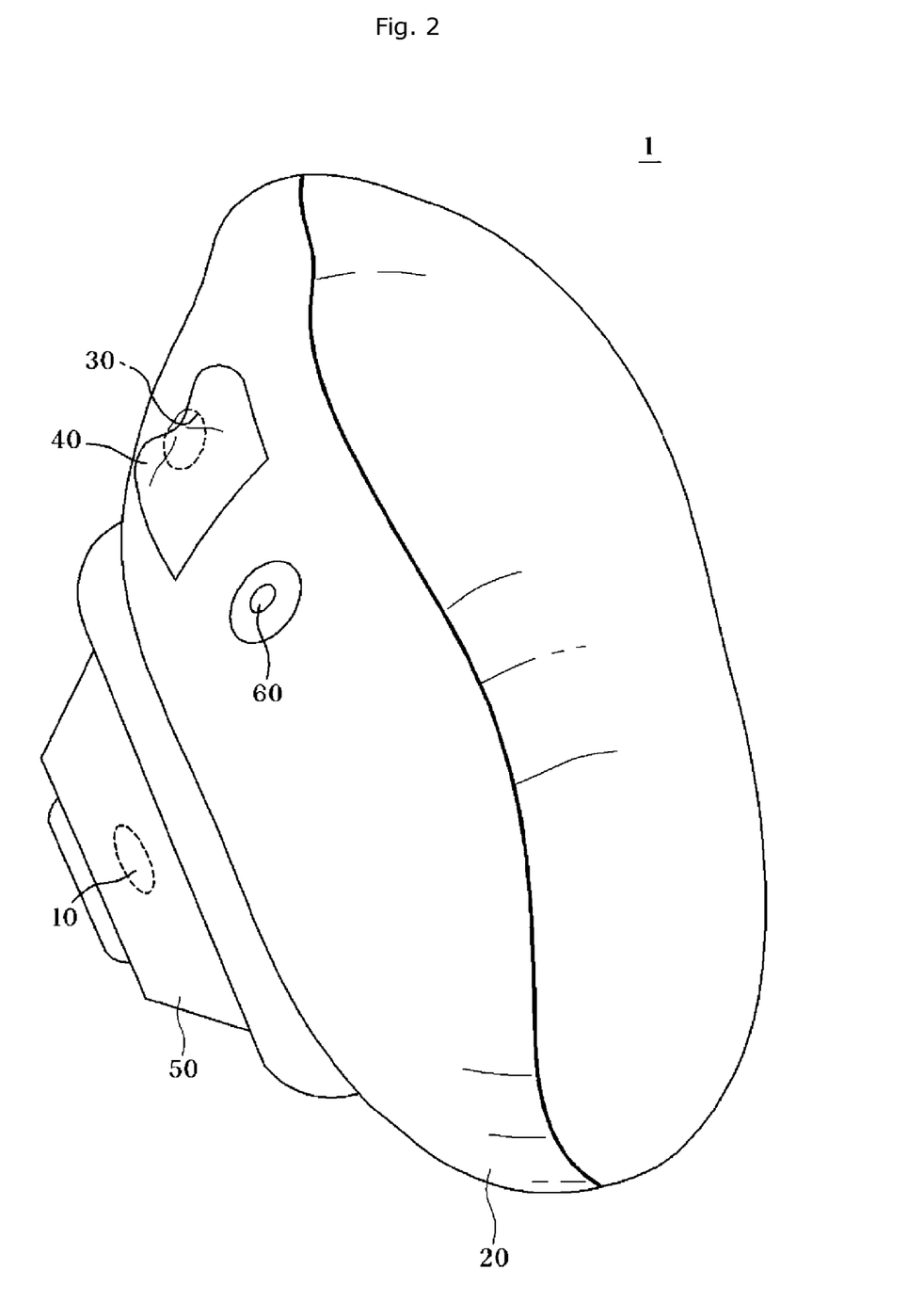
FIG. 2 is a diagram illustrating the cushion in a high-pressure state in the airbag system for a vehicle in accordance with the embodiment of the present invention.
Figure 3:
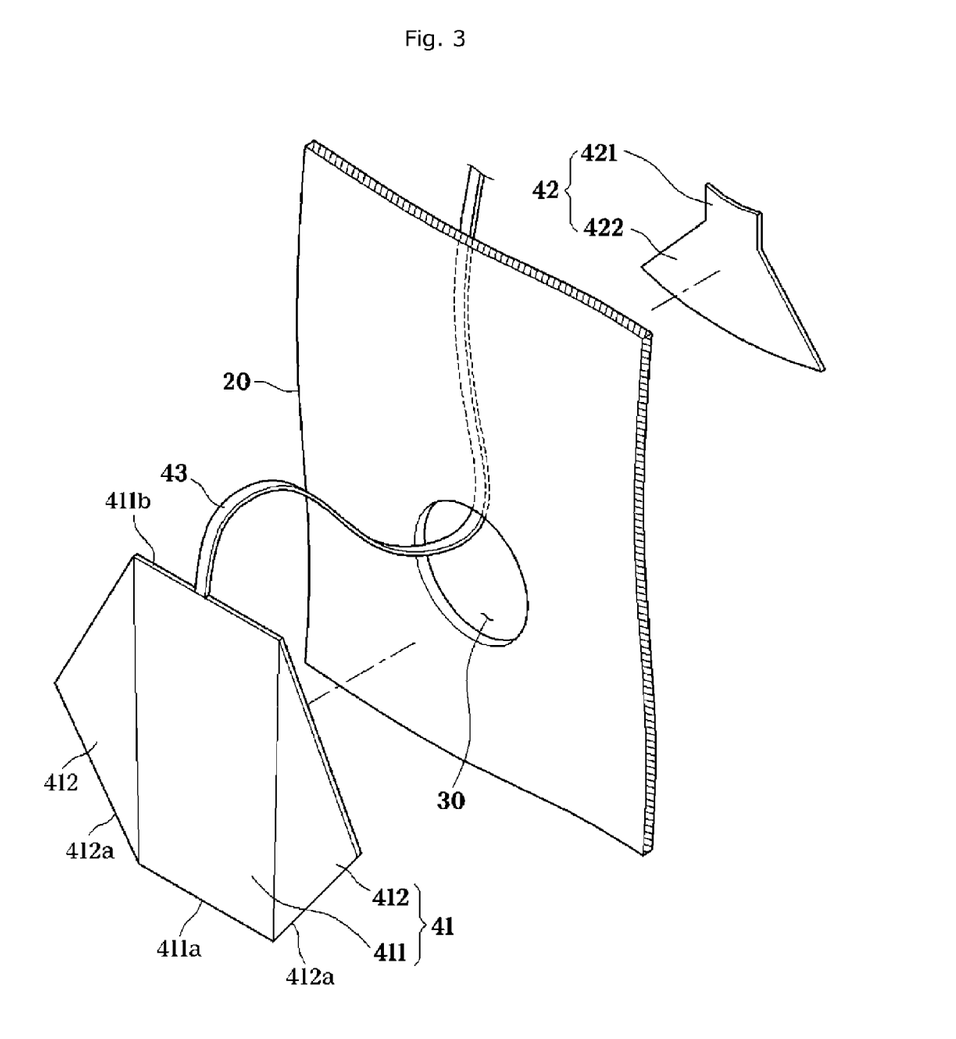
FIG. 3 is an exploded diagram of the airbag system for a vehicle in accordance with the embodiment of the present invention.
Figure 4:
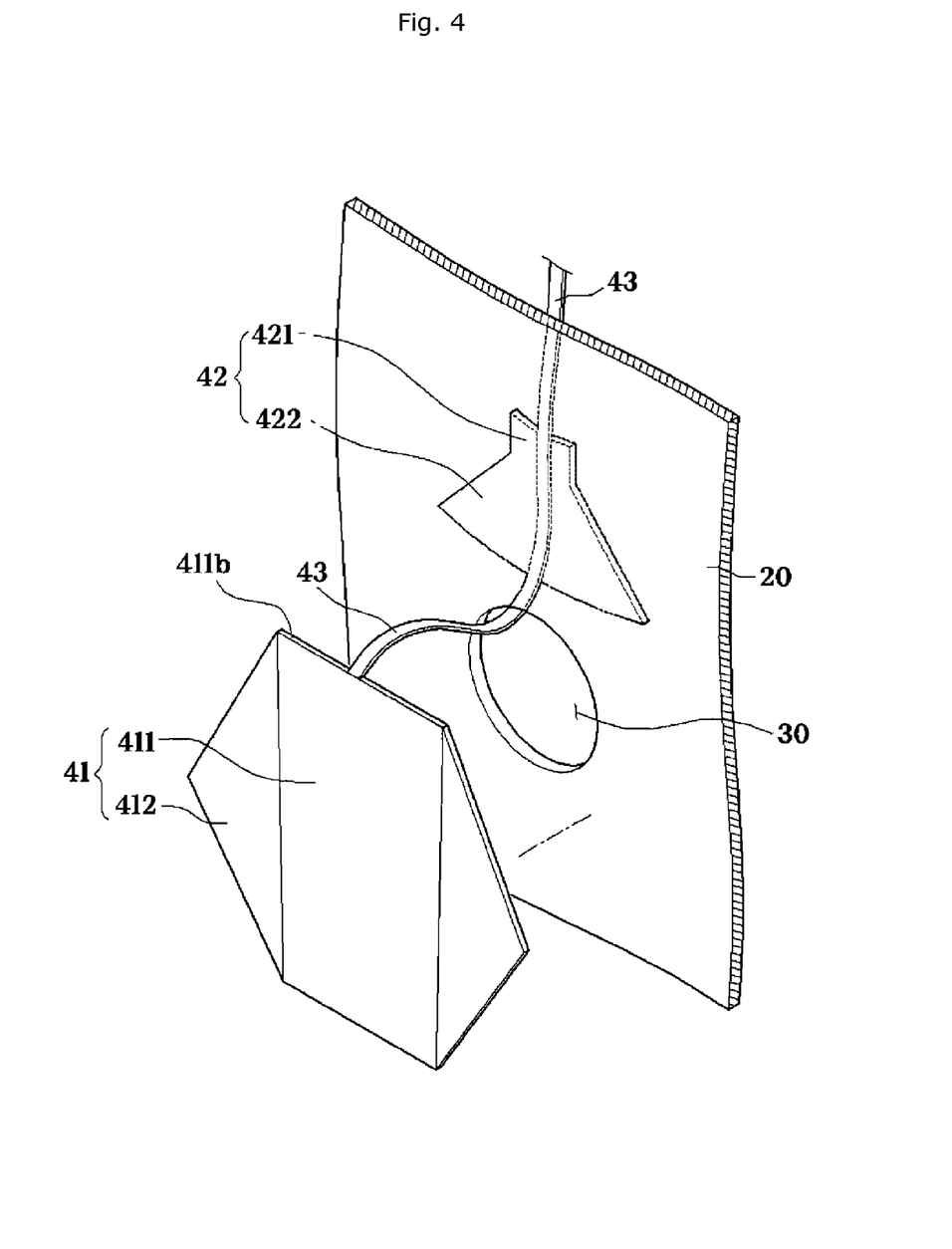
FIG. 4 is an assembled diagram of the airbag system for a vehicle in accordance with the embodiment of the present invention.

FIG. 1 is a diagram schematically illustrating a cushion in a low-pressure state in an airbag system for a vehicle in accordance with an embodiment of the present invention. FIG. 2 is a diagram illustrating the cushion in a high-pressure state in the airbag system for a vehicle in accordance with the embodiment of the present invention. FIG. 3 is an exploded diagram of the airbag system for a vehicle in accordance with the embodiment of the present invention. FIG. 4 is an assembled diagram of the airbag system for a vehicle in accordance with the embodiment of the present invention.

Referring to FIGS. 1 and 4, the airbag system 1 for a vehicle in accordance with the embodiment of the present invention may include an inflator 10, a cushion 20, a variable hole 30, and an adjusting unit 40. The cushion 20 may be embedded in an airbag housing 50 with the inflator 10. The variable hole 30 may be formed in the cushion 20, and the adjusting unit 40 may be mounted on the cushion 20. The airbag system 1 for a vehicle may be mounted at the front of a driver's seat or passenger seat so as to protect a passenger.

The inflator 10 may be arranged in the airbag housing 50. When the vehicle collides, the inflator 10 may receive a collision signal and discharge gas. The cushion 20 may be unfolded by the gas supplied from the inflator 10 and protect a passenger. For example, the cushion 20 may be folded and stored in the airbag housing 50, and inflated by the gas supplied from the inflator 10.

The variable hole 30 may be formed in the cushion 20, and the gas within the cushion 20 may be discharged through the variable hole 30. The cushion 20 may have a separate outlet 60 for preventing an excessive rise in internal pressure thereof. As described above, the cushion 20 may be inflated by the gas supplied from the inflator 10. After the cushion 20 is completely unfolded, the gas can be discharged to the outside of the cushion 20 through the outlet 60, which makes it possible to prevent an excessive rise in internal pressure of the cushion 20.

The adjusting unit 40 may be mounted on the cushion 20, and open/close the variable hole 30 according to how much the cushion 20 is unfolded.

Figure 7:
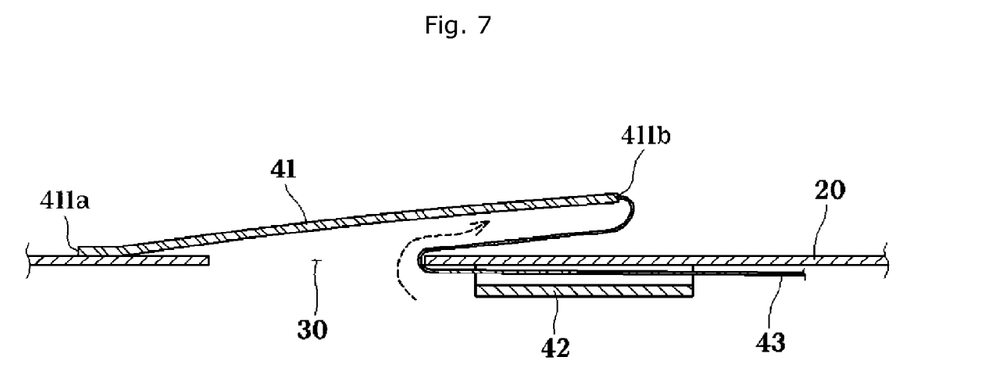
FIG. 7 is a side view illustrating the structure of the airbag system in a low-pressure state in accordance with the embodiment of the present invention.

Specifically, since the adjusting unit 40 opens the variable hole 30 at the initial stage of the process in which the cushion 20 is unfolded, the cushion 20 may form a low-pressure state (refer to FIG. 7). Thus, the cushion 20 may prevent an impact from being applied to the passenger while coming in contact with the passenger, thereby preventing an injury of the passenger. In particular, even when a passenger is seated out of a safety zone, the cushion 20 may be unfolded at low pressure at the initial stage, thereby preventing a passenger from getting injured while the cushion 20 is unfolded.

Specifically, since the adjusting unit 40 closes the variable hole 30 after the middle stage of the process in which the cushion 20 is unfolded, the cushion 20 may form a high-pressure state. Thus, since the gas supplied into the cushion 20 is not discharged to the outside through the variable hole 30, the cushion 20 may be rapidly expanded and unfolded. Then, the passenger can be protected from an external impact.

Figure 5:
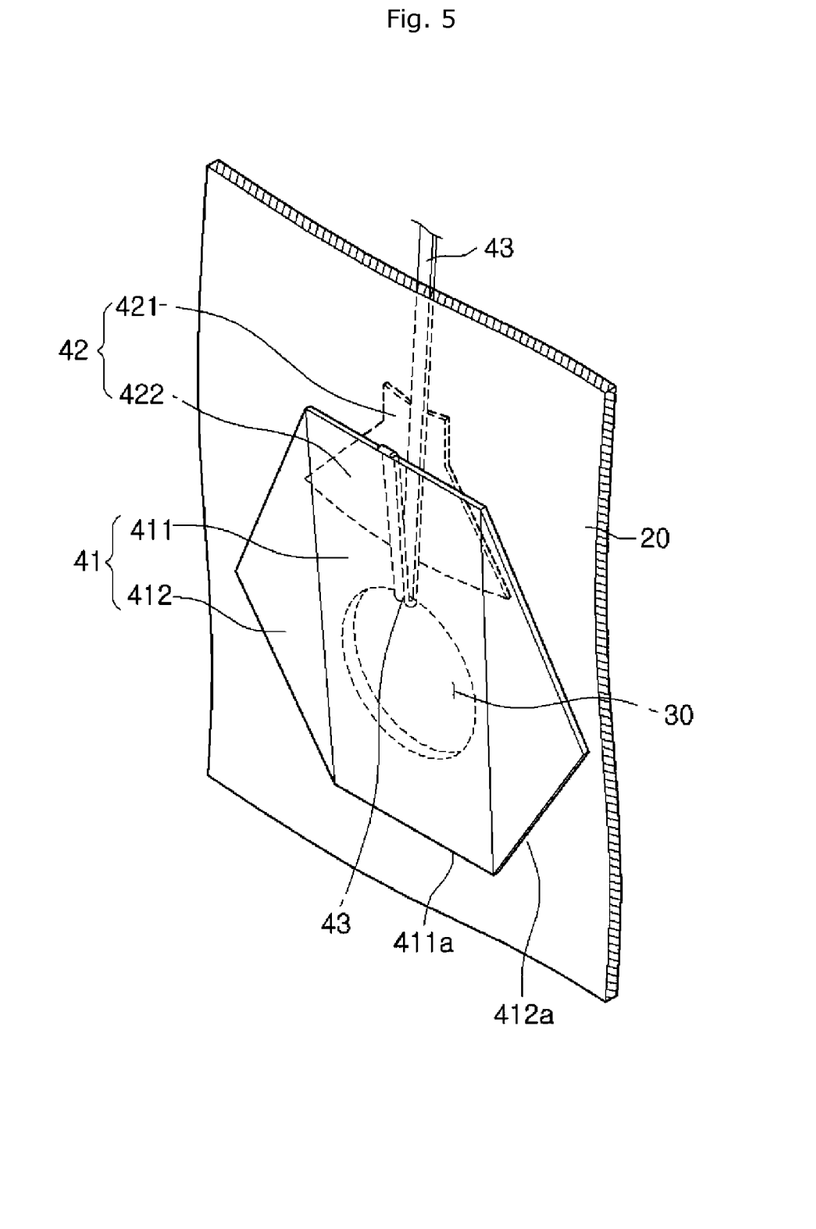
FIG. 5 is a diagram illustrating a state in which an adjusting unit is arranged over a variable hole in the airbag system for a vehicle in accordance with the embodiment of the present invention.
Figure 6:
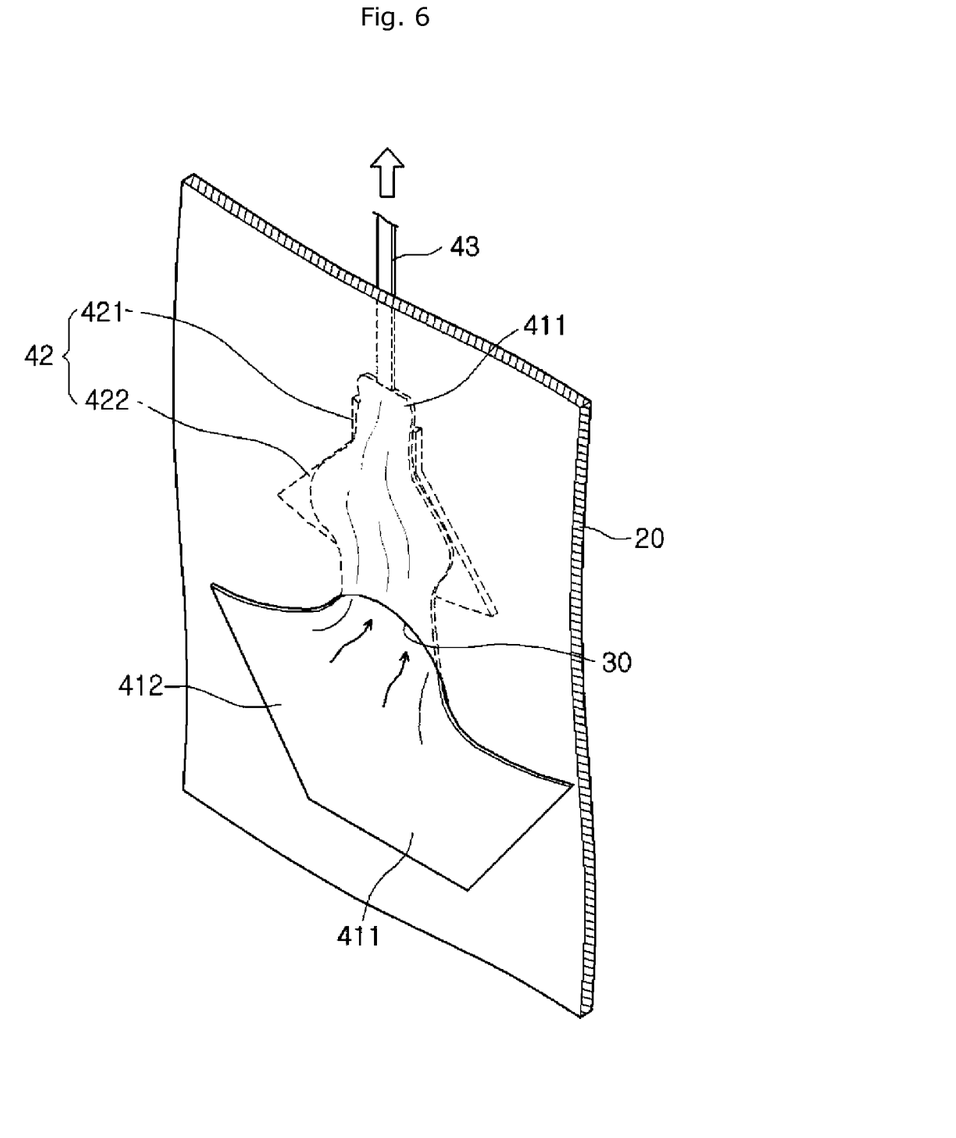
FIG. 6 is a diagram illustrating a state in which the adjusting unit is caught in an induction part through the variable hole in the airbag system for a vehicle in accordance with the embodiment of the present invention.
Figure 8:
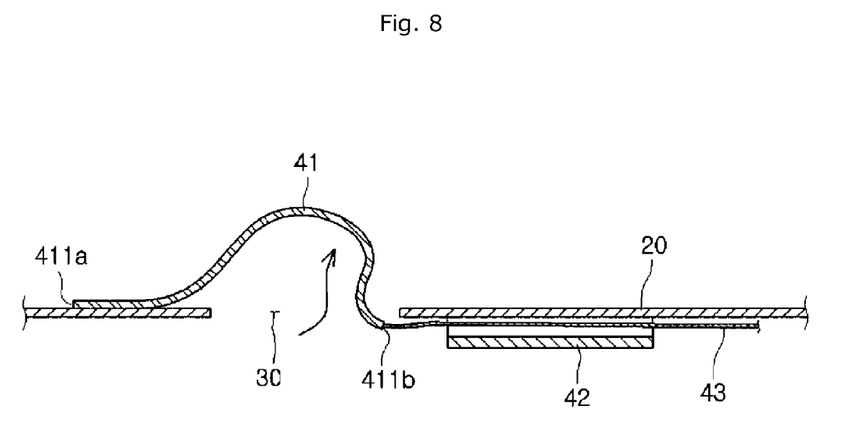
FIG. 8 is a side view illustrating a state in which the adjusting unit is moved in connection with movement of a connection part in the airbag system for a vehicle in accordance with the embodiment of the present invention.
Figure 9:
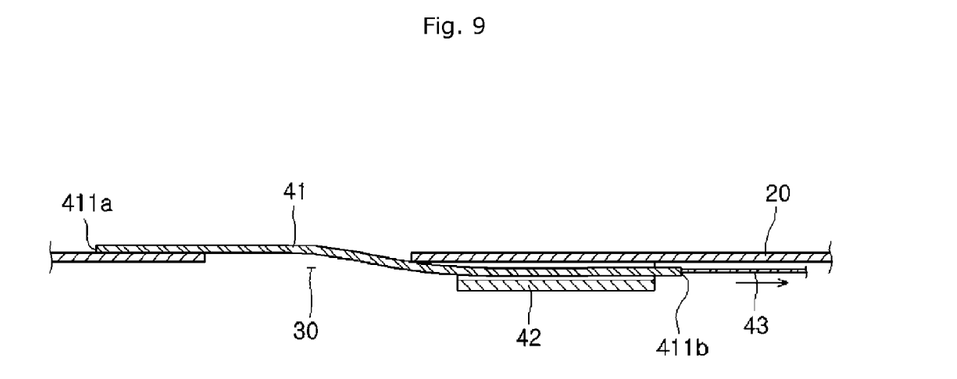
FIG. 9 is a side view illustrating the structure of the airbag system in a high-pressure state in accordance with the embodiment of the present invention.

FIG. 5 is a diagram illustrating a state in which the adjusting unit is arranged over the variable hole in the airbag system for a vehicle in accordance with the embodiment of the present invention. FIG. 6 is a diagram illustrating a state in which the adjusting unit is caught in an induction part through the variable hole in the airbag system for a vehicle in accordance with the embodiment of the present invention. FIG. 7 is a side view illustrating the structure of the airbag system in a low-pressure state in accordance with the embodiment of the present invention. FIG. 8 is a side view illustrating a state in which the adjusting unit is moved in connection with movement of a connection part in the airbag system for a vehicle in accordance with the embodiment of the present invention. FIG. 9 is a side view illustrating the structure of the airbag system in a high-pressure state in accordance with the embodiment of the present invention.

Referring to FIGS. 5 and 9, the adjusting unit 40 in accordance with the embodiment of the present invention may include an opening/closing part 41, an induction part 42, and a connection part 43.

The opening/closing part 41 may be coupled to the outer surface of the cushion 20, and formed to surround the variable hole 30 such that the variable hole 30 can be closed. In the present embodiment, the opening/closing part 41 may include a center opening/closing part 411 and a side opening/closing part 412.

The center opening/closing part 411 may have an end 411a coupled to the outer surface of the cushion 20 and the other end 411b coupled to the connection part 43. The center opening/closing part 411 may be separated from the variable hole 30. Specifically, the center opening/closing part 411 may cover the variable hole 30 from outside in a state where the center opening/closing part 411 is separated from the variable hole 30. For example, the center opening/closing part 411 may have a rectangular shape, the one end 411a of the center opening/closing part 411 may be sewed to the cushion 20, and the other end 411b of the center opening/closing part 411 may be sewed to the connection part 43. The center opening/closing part 411 may be arranged over the variable hole 30 so as to cover the variable hole 30 outside the cushion 20 (refer to FIG. 7).

The side opening/closing part 412 may be extended from both ends of the center opening/closing part 411, and coupled to the outer surface of the cushion 20. For example, the side opening/closing part 412 may have a triangle shape extended from both ends of the center opening/closing part 411, and one end 412a of the side opening/closing part 412, connected to the one end 411a of the center opening/closing part 411, may be sewed to the cushion 20.

The induction part 42 may be coupled to the internal surface of the cushion 20, that is, the opposite side of the surface at which the opening/closing part 41 is installed. In the present embodiment, the induction part 42 may include a connection induction part 421 and an opening/closing induction part 422. Since both ends of the induction part 42 are coupled to the cushion 20 but the other portions of the induction part 42 excluding both ends are not coupled to the cushion 20, the induction part 42 may have an internal path through which the connection part 43 can be moved. The internal path of the induction part 42 may include an internal path of an opening/closing induction part 422 and an internal part of a connection induction part 421.

Both ends of the connection induction part 421 may be sewed to the internal surface of the cushion 20. The connection part 43 can be moved through the internal path between the connection induction part 421 and the cushion 20.

The opening/closing induction part 422 may be extended from the connection induction part 421 toward the variable hole 30, and coupled to the inner surface of the cushion 20. Both end of the opening/closing induction part 422 may be sewed to the internal surface of the cushion 20, like the connection induction part 421. The opening/closing induction part 422 may have a width that gradually increases toward the variable hole 30. Thus, when the opening/closing part 41 is moved in connection with the movement of the connection part 43, the opening/closing part 41 may be more easily inserted toward the opening/closing induction part 422 due to the shape of the opening/closing induction part 422.

When the cushion 20 is unfolded, the end of the connection part 43 may be moved in the direction where the connection part 43 is separated from the variable hole 30 as the cushion 20 is expanded. Then, tension may be applied to the connection part 43. As the other end 411*b* of the opening/closing part 41 is pulled by the movement of the connection part 43 and the application of tension, the opening/closing part 41 may be passed through the variable hole 30 and then inserted into the opening/closing induction part 422. Then, as the connection part 43 is continuously moved, the opening/closing part 41 may be inserted into the internal path of the connection induction part 421 through the internal path of the opening/closing induction part 422. At this time, since the internal path of the connection induction part 421 has a smaller width than the internal path of the opening/closing induction part 422, the opening/closing part 41 entering the internal path of the connection induction part 421 may not be moved but stopped while tightly fitted into the internal path of the connection induction part 421. Since the position of the opening/closing part 41 is fixed as the opening/closing part 41 is tightly fitted to the internal path of the connection induction part 421 (refer to FIGS. 6 and 9), the opening/closing part 41 may maintain the state in which the opening/closing part 41 closes the variable hole 30 in a state where the opening/closing part 41 is fixed to the connection induction part 421, even though the tension of the connection part 43 weakens or disappears. In other words, the opening/closing part 41 may prevent the opening of the variable hole 30, while mainlining the state in which the opening/closing part 41 is fixed to the connection induction part 421.

Figure 10:
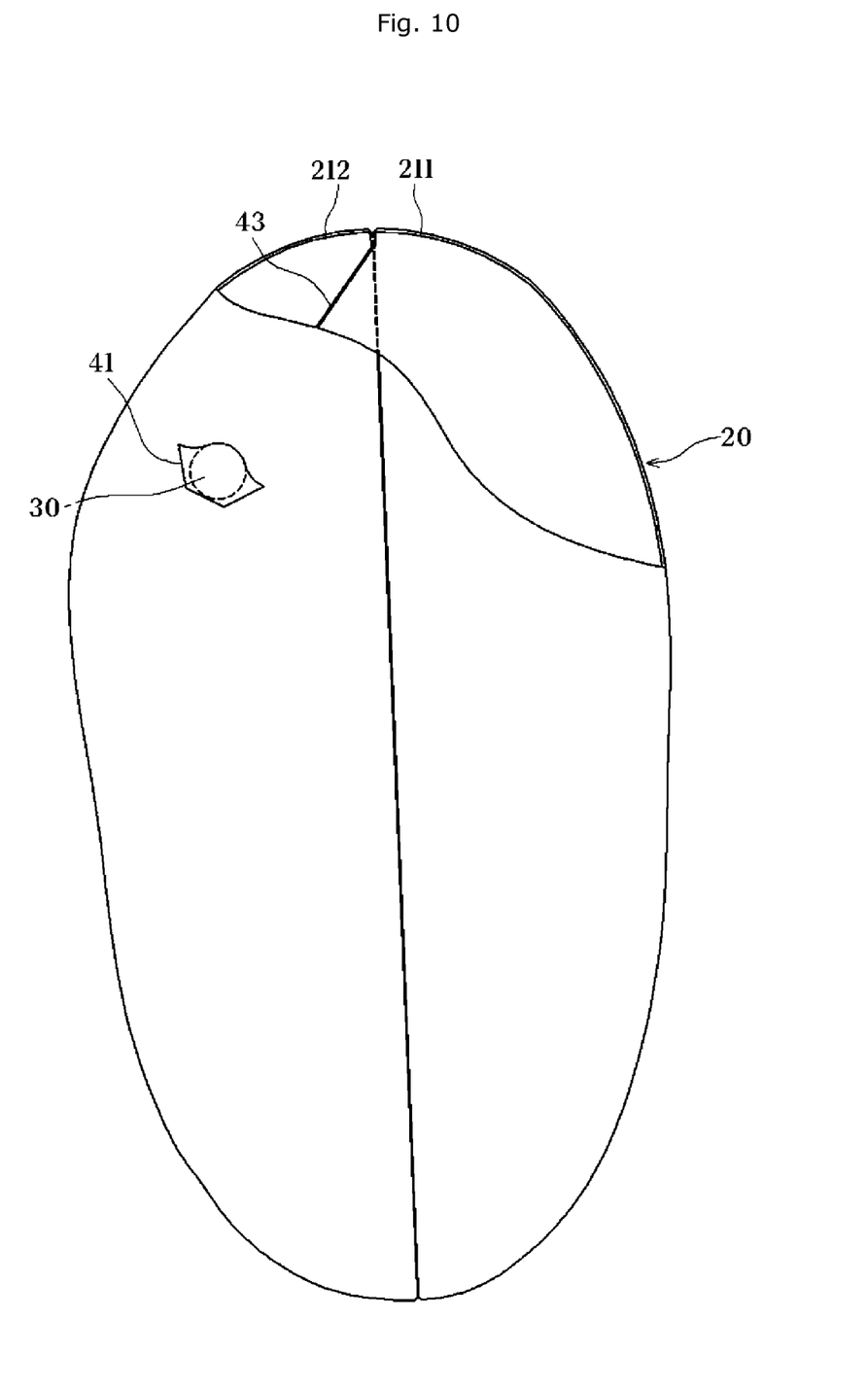
FIG. 10 is a diagram schematically illustrating the positions of the connection part and the variable hole in the airbag system for a vehicle in accordance with the embodiment of the present invention.

FIG. 10 is a diagram schematically illustrating the positions of the connection part and the variable hole in the airbag system for a vehicle in accordance with the embodiment of the present invention.

Referring to FIGS. 5 to 10, the connection part 43 in accordance with the embodiment of the present invention may have one end coupled to the internal surface of the cushion 20 and the other end coupled to the other end of the opening/closing part 41. Before the cushion 20 is unfolded, the connection part 43 may be passed through the variable hole 30 and placed through the induction part 42.

In embodiments of the present invention, one end of the connection part 43 may be coupled to the top center of the cushion 20 (based on FIG. 8), and the variable hole 30 may be formed at a position excluding the center of the cushion 20. If a vehicle collision occurs, a passenger seated in an abnormal state may come in contact with the top center of the cushion 20. At this time, since one end of the connection part 43 is coupled to the top center of the cushion 20, the unfolding of the cushion 20 to the top center may be delayed by the passenger seated in an abnormal state, at the initial stage of the process in which the cushion 20 is unfolded. Thus, the cushion 20 may maintain the low-pressure state a little more. As the passenger seated in an abnormal state suppresses the movement of the one end of the connection part 43, the tension of the connection part 43, formed by the movement of the one end of the connection part 43, may be more slowly provided. The variable hole 30 may be formed at a position excluding the center of the cushion 20, with which the passenger typically comes in contact, which makes it possible to prevent an unexpected opening/closing of the variable hole 30 through a contact with the passenger.

In the present embodiment, the cushion 20 may include a front cushion 211 coming in contact with the passenger and a rear cushion 212 sewed to an end of the front cushion 211. At this time, the rear cushion 212 may be mounted in the airbag housing 50.

The connection part 43 may be sewed to a position at which the front cushion 211 and the rear cushion 212 meet each other. The variable hole 30 may be formed in the rear cushion 212 and block interference with a passenger when gas is discharged. Furthermore, the variable hole 30 may be arranged in the 10 o'clock or 2 o'clock direction of the rear cushion 212 such that interference with the head of the passenger is excluded.

When the passenger is seated in an abnormal state, the passenger may bump the head against the upper portion of the cushion 20. When the head of the passenger seated in an abnormal state presses the upper portion of the cushion 20, the application of tension by the connection part 43 may be limited while the movement of the one end of the connection part 43 is limited. Thus, the opening/closing part 41 may maintain the inside of the cushion 20 in a low-pressure state while maintaining the state in which the variable hole 30 is opened. The connection part 43 may be sewed to a position where the top of the front cushion 211 and the top of the rear cushion 212 are sewed.

Figure 11:
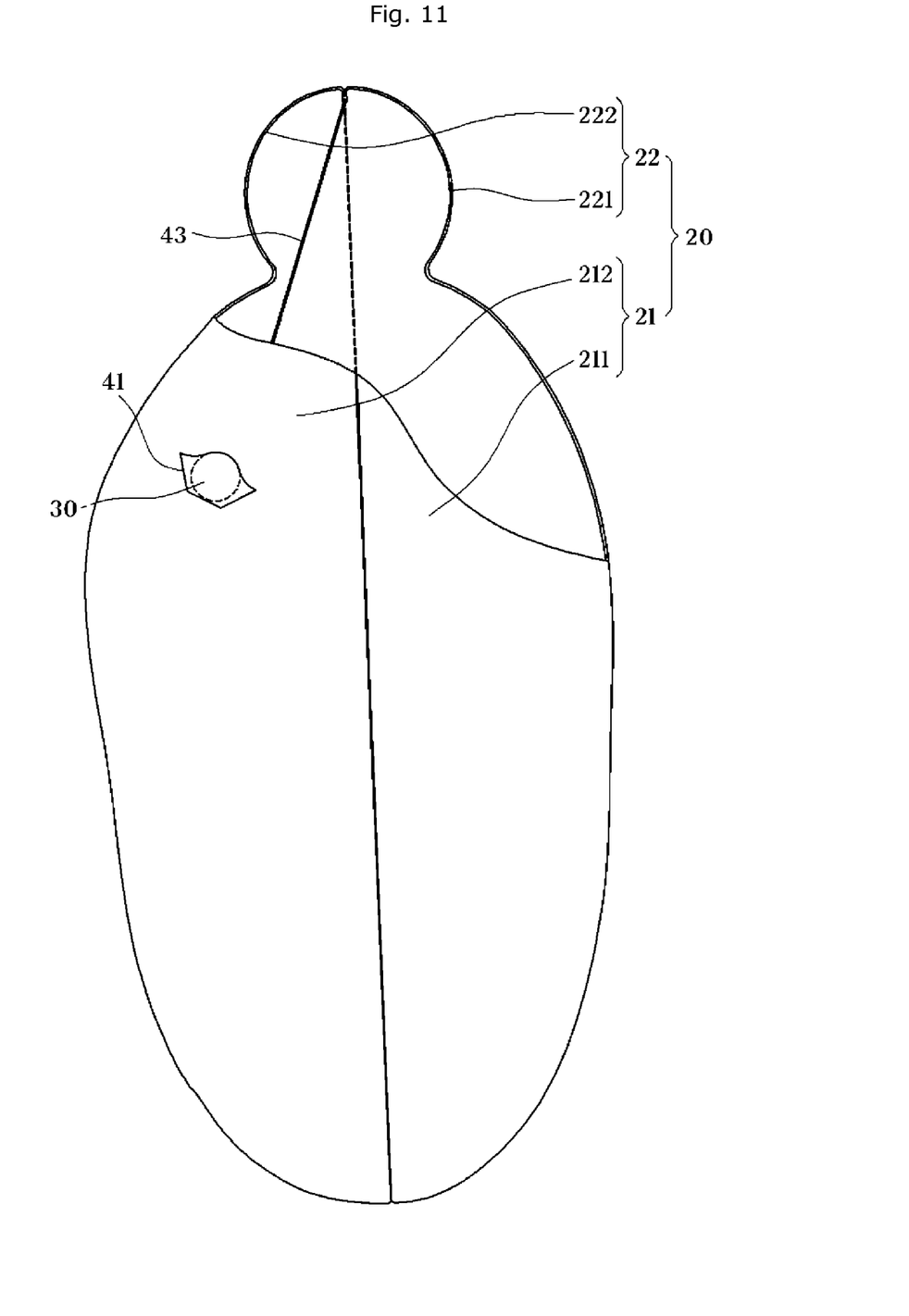
FIG. 11 is a diagram schematically illustrating a cushion including an auxiliary cushion in the airbag system for a vehicle in accordance with the embodiment of the present invention.

FIG. 11 is a diagram schematically illustrating a cushion including an auxiliary cushion in the airbag system for a vehicle in accordance with the embodiment of the present invention.

Referring to FIG. 11, the cushion 20 in accordance with the embodiment of the present invention may include a main cushion 21 and an auxiliary cushion 22. The main cushion 21 may be coupled to the inflator 10, and unfolded by gas supplied from the inflator 10. The auxiliary cushion 22 may protrude from the top center of the main cushion 21, and communicate with the main cushion 21. At this time, one end of the connection part 43 may be coupled to the auxiliary cushion 22. When the connection part 43 is coupled to the auxiliary cushion 22, the moving distance of the connection part 43 may be increased in case where the cushion 20 is unfolded. Then, the mobility of the opening/closing part 41 coupled to the other end of the connection part 43 can be secured. That is, since the magnitude of the tension provided to the connection part 43 increases as the moving distance of the connection part 43 increases, the moving distance of the opening/closing part 41 moved by the tension of the connection part 43 can be further expanded.

In the present embodiment, the main cushion 21 may include the front cushion 211 coming in contact with the passenger and the rear cushion 212 sewed to an end of the front cushion 211. The auxiliary cushion 22 may include an auxiliary front cushion 221 protruding upward from the top of the front cushion 211 and an auxiliary rear cushion 222 protruding upward from the top of the rear cushion 212. The connection part 43 may be sewed with the auxiliary front cushion 221 and the auxiliary rear cushion 222.

The operation principle of the airbag system for a vehicle in accordance with the embodiment of the present invention will be described as follows.

The inside of the folded cushion 20 may be coupled to one end of the connection part 43 and both ends of the induction part 42, and the outside of the cushion 20 may be coupled to the opening/closing part 41 so as to cover the variable hole 30. At this time, the connection part 43 may be passed through the connection induction part 421 and the opening/closing induction part 422 of the induction part 42, and coupled to the opening/closing part 41 through the variable hole 30. In the above-described state, gas of the inflator 10 may be supplied to the cushion 20, and the cushion 20 may start to be unfolded.

Since the opening/closing part 41 is separated from the variable hole 30 at the initial stage of the process in which the cushion 20 is unfolded, gas may be discharged through the variable hole 30 and induce the cushion 20 to be unfolded at low pressure (refer to FIG. 7). Thus, although a passenger seated in an abnormal state comes in contact with the cushion 20, the passenger may not receive a large impact from the cushion 20.

When the cushion 20 is continuously unfolded, the connection part 43 coupled to the inside of the cushion 20 may be moved. When the connection part 43 is moved, the opening/closing part 41 coupled to the connection part 43 may be moved along the connection part 43 and open/close the variable hole 30 (refer to FIGS. 6 and 9). That is, the opening/closing part 41 moved along the connection part 43 may block gas from being discharged through the variable hole 30 while being inserted into the opening/closing induction part 422 and the connection induction part 421, thereby inducing the cushion 20 to be unfolded at high pressure. Then, since the cushion 20 is rapidly unfolded, the cushion 20 can protect a passenger during a vehicle collision.

When the auxiliary cushion 22 is formed at the top center of the main cushion 21 so as to protrude toward the outside from the main cushion 21 and the connection part 43 is coupled to the auxiliary cushion 22, a larger moving distance of the connection part 43 can be secured in case where the cushion 20 is unfolded. Thus, the stable movement of the opening/closing part 41 can be induced (refer to FIG. 11).

In the airbag system 1 for a vehicle in accordance with the embodiment of the present invention, the adjusting unit 40 may open/close the variable hole 30 according to the condition in which the cushion 20 is unfolded. Thus, even when the passenger is seated out of the safety zone, that is, even when the passenger is seated in an abnormal state, the airbag system 1 can prevent an injury of the passenger, which may occur when the cushion 20 is unfolded. Furthermore, as the cushion 20 is gradually unfolded, a portion of the variable hole 30, closed by the adjusting unit 40, may increase. Then, as the cushion 20 is unfolded at high pressure, the cushion 20 can be rapidly unfolded to protect the passenger when an accident occurs.

In the airbag system 1 for a vehicle in accordance with the embodiment of the present invention, when the cushion 20 is initially unfolded, the cushion 20 may be unfolded at low speed while the variable hole 30 is opened. Thus, the airbag system 1 can protect even a passenger seated in an abnormal state. Furthermore, when a passenger is seated in an abnormal state, the unfolding of the cushion 20 may be slightly delayed. Then, the cushion 20 may be unfolded at low pressure and reduce an impact applied to the passenger.

In the airbag system 1 for a vehicle in accordance with the embodiment of the present invention, the auxiliary cushion 22 communicating with the main cushion 21 may protrude from the main cushion 21 and thus secure the moving distance of the connection part 43 connected to the auxiliary cushion 22.

The airbag system 1 for a vehicle in accordance with the embodiment of the present invention can reduce the weight and cost while having a function corresponding to the dual inflator.

Furthermore, since the opening/closing part 41 is forced and fixed into the connection induction part 421, the opening/closing part 41 may maintain the state in which the opening/closing part 41 is fixed to the connection induction part 421, even though the tension of the connection part 43 is weakened, thereby preventing the opening of the variable hole 30.

In accordance with the embodiments of the present invention, the adjusting unit may open/close the variable hole according to the unfolding situation of the cushion. Thus, even when a passenger is seated out of the safety zone, that is, even when the passenger is seated in an abnormal state, the airbag system can prevent an injury of the passenger, which may occur while the cushion is unfolded.

Furthermore, as the cushion is gradually unfolded, a portion of the variable hole, closed by the adjusting unit, may be increased. Then, as the cushion is unfolded at high pressure, the cushion may be rapidly unfolded to protect the passenger during a sudden accident.

Furthermore, when the cushion is initially unfolded, the cushion may be unfolded at low speed while the variable hole is opened. Thus, the airbag system can protect even a passenger seated in an abnormal state.

Furthermore, when the passenger is seated in an abnormal state, the unfolding of the cushion may be slightly delayed. Thus, the cushion may be unfolded at low pressure and reduce an impact applied to the passenger.

Furthermore, as the auxiliary cushion communicating with the main cushion protrudes from the main cushion, the moving distance of the connection part connected to the auxiliary cushion can be secured.

Furthermore, the airbag system for a vehicle can reduce the weight and cost, while having a function corresponding to the dual inflator.

Furthermore, since the opening/closing part is forced and fixed into the connection induction part, the opening/closing part can maintain the state in which the opening/closing part is fixed to the connection induction part, even though the tension of the connection part is weakened, thereby preventing the opening of the variable hole.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An airbag system for a vehicle, comprising:
   an inflator;
   a cushion configured to be unfolded in response to gas supplied from the inflator;
   a hole formed in the cushion and configured to discharge the gas from the cushion; and
   an adjusting unit mounted on the cushion and configured to close the hole according to how much the cushion is unfolded,
   wherein the adjusting unit comprises:
      an opening/closing part coupled to the outside of the cushion and configured to cover the hole,
      a connection part having one end coupled to the inside of the cushion and the other end coupled to the opening/closing part, and an induction part coupled to the inside of the cushion and having an internal path configured to guide movement of the connection part.
2. The airbag system of claim 1, wherein the opening/closing part comprises:
   a center opening/closing part having one end coupled to the outside of the cushion and the other end coupled to the connection part, and arranged over the hole such that the center opening/closing part cover hole when the cushion is folded; and
   a side opening/closing part extended from side of the center opening/closing part and coupled to the outside of the cushion.
3. The airbag system of claim 1, wherein the induction part comprises:
   a connection induction part coupled to the inside of the cushion and configured to guide movement of the connection part; and
   an opening/closing induction part having an internal path extended toward the hole from the connection induction part.
4. The airbag system of claim 1, wherein the opening/closing part is configured to move according to movement of the connection part when the cushion expands, and wherein the opening/closing part does not move while the opening/closing part is fitted into the internal path.
5. The airbag system of claim 1, wherein the hole is formed at a position deviating from the center of the cushion, and
   the one end of the connection part is coupled to the center of the front and rear surfaces of the cushion.
6. The airbag system of claim 1, wherein a portion of the hole closed by the opening/closing part when the cushion is folded opens when the one end of the connection part moves as the cushion is unfolded.

7. The airbag system of claim 1, wherein the cushion comprises:
   a main cushion configure to inflate in response to the gas supply from the inflator; and
   an auxiliary cushion protruding, from the top center of the main cushion and connected to the main cushion, and
   wherein the one end of the connection part is coupled to the auxiliary cushion.
8. The airbag system of claim 1, wherein the cushion has an outlet for discharging internal gas to the outside.
9. An airbag comprising:
   an inflator configured to generate gas;
   a cushion connected to the inflator and configured to inflate by gas supplied from the inflator;
   a hole formed through the cushion;
   a cover comprising a first end attached to an outside of the cushion and a second end not attached to the outside of the cushion, the cover being placed over the hole from outside the cushion such that the second end is across the hole from the first end prior to inflating the cushion;
   a guide member attached to an inner surface of the cushion to provide a channel; and
   a connection cord passing through the channel provided by the guide member and connecting between the cover and inside the cushion such that as the cushion inflates by gas from the inflator, the connection cord pulls the cover such that the second end is pulled through the hole into inside the cushion while the first end remains outside the cushion.
10. The airbag of claim 9, wherein the cover and the guide member are configured such that the second end is at least in part pulled into the channel as the cushion inflates.

* * * * *